Dec. 9, 1958
C. E. HOITT ET AL
2,863,414
CLOSURE FOR SHIP PORT
Filed June 6, 1956
3 Sheets-Sheet 1
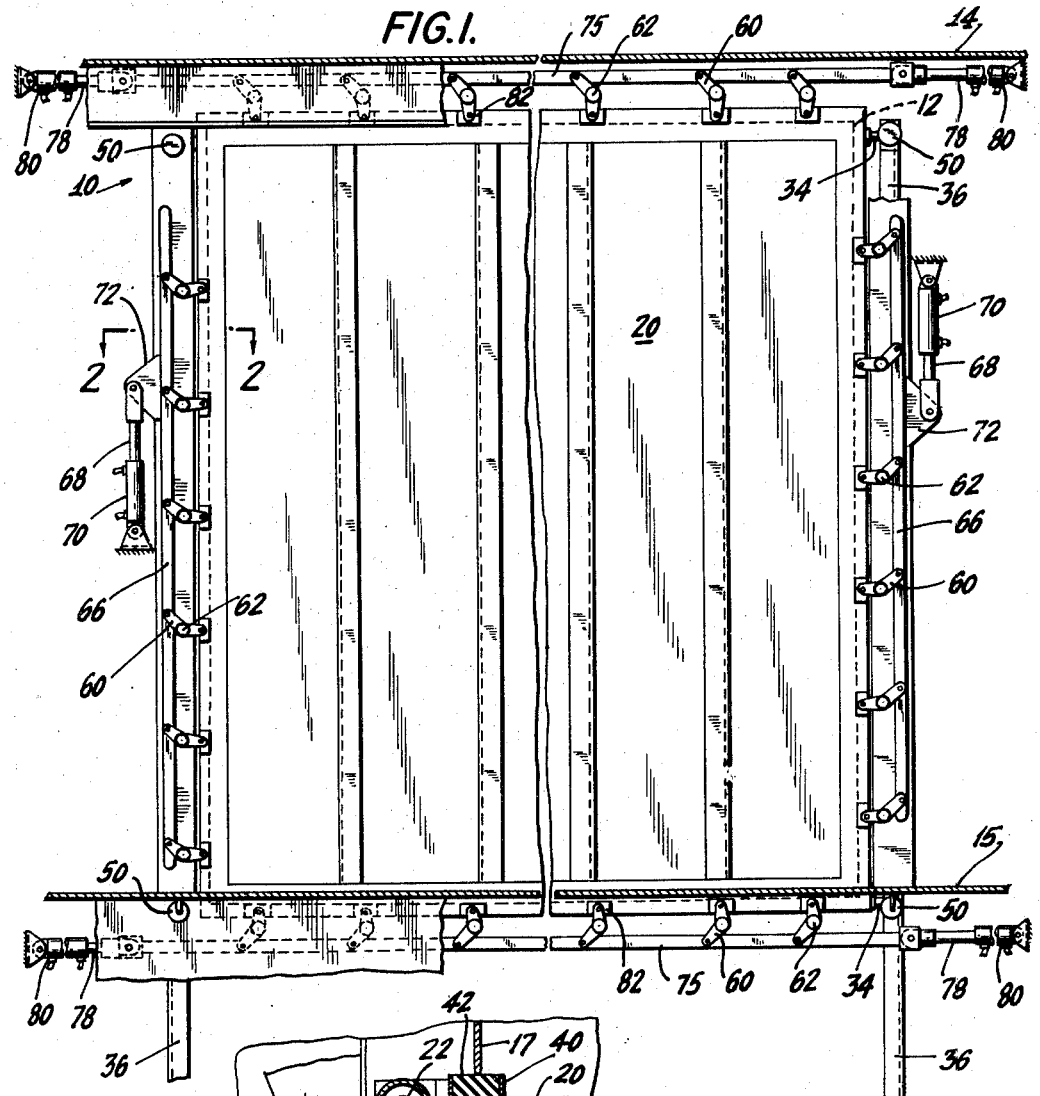

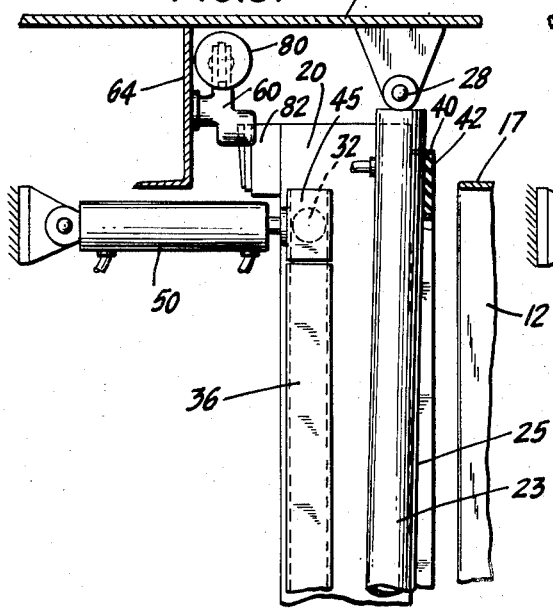
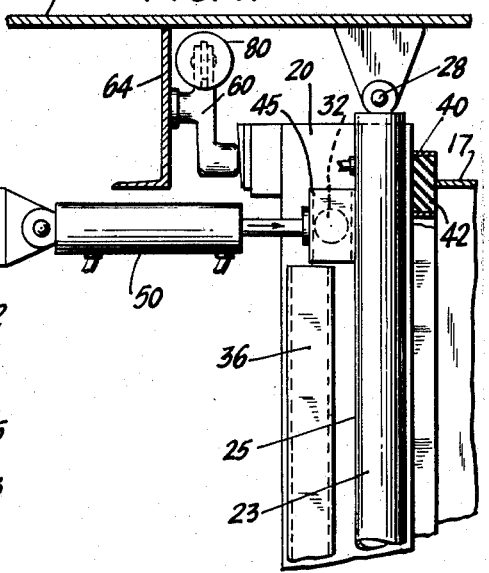
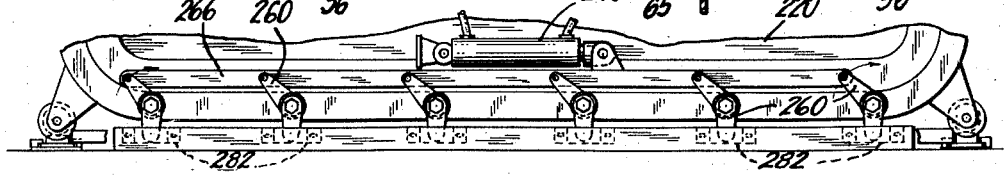

Dec. 9, 1958    C. E. HOITT ET AL    2,863,414
CLOSURE FOR SHIP PORT
Filed June 6, 1956    3 Sheets-Sheet 3
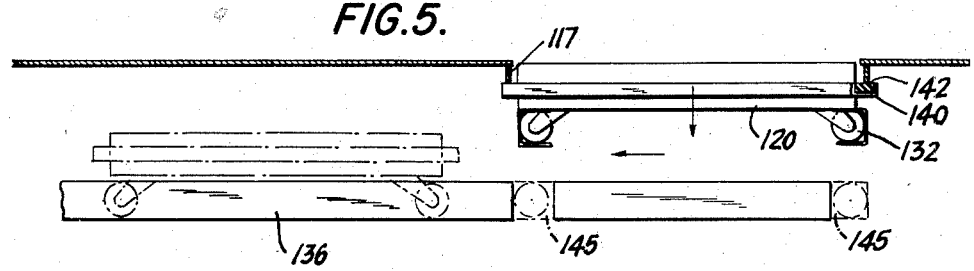
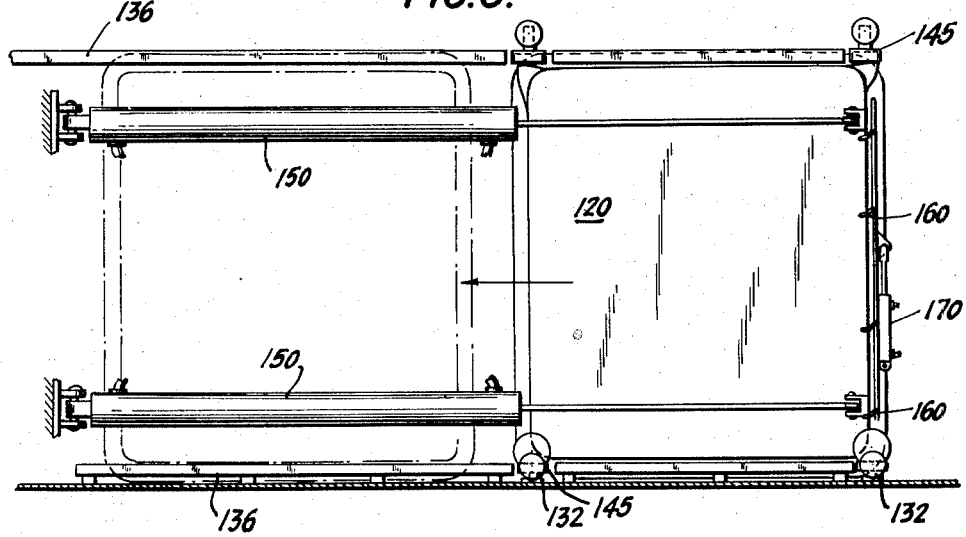
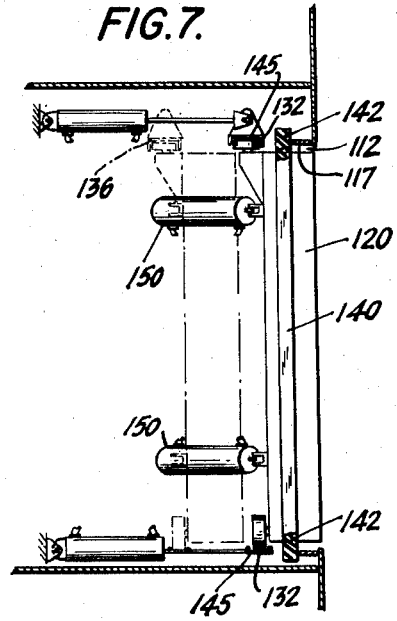

United States Patent Office 2,863,414
Patented Dec. 9, 1958

2,863,414

CLOSURE FOR SHIP PORT

Clifford E. Hoitt, Greenwich, Conn., and Cyril T. Krenzer, Churchville, N. Y., assignors to Walz & Krenzer, Inc., Rochester, N. Y., a corporation of New York Application June 6, 1956, Serial No. 589,750

7 Claims. (Cl. 114—173)

The present invention relates to doors and, although not necessarily confined thereto, it is more particularly concerned with water-tight doors and like passageway closures for use on ships.

Modern ships, particularly cargo ships, are provided with openings in the sides of their hulls for the loading and unloading of cargo, particularly cargo which can be rolled up a ramp into the openings, such as automobiles, trucks and the like. Loading of the ship is thus greatly facilitated and expedited. When the ship is underway, however, these side openings must of course be closed and, since they are not generally very far above the water-line, it is important that they be securely water-tight, for obvious reasons. While the desired water-tightness can generally be obtained readily in the case of small openings which may be closed by a hinged door, a more serious problem is presented by large openings for the closing of which a hinged door is not always entirely suitable. While various proposals have been advanced for the construction of water-tight doors or closures for such large side openings in ships, these proposals have not been entirely satisfactory in that the desired water-tightness has not always been obtained or excessively complex and expensive arrangements have been necessary in order to provide for the proper sealing of the door against ingress of water.

It is the principal object of the present invention to provide a door construction adapted to effect the water-tight closing of the opening with which it is associated.

It is another object of the invention to provide a construction of the character indicated which is particularly suitable for use with side cargo openings in ships.

It is a further object of the invention to provide a door construction for ship cargo openings which avoids the disadvantages and drawbacks of doors heretofore proposed for this purpose.

Another object of the invention is the provision of a door for the water-tight closing of side cargo openings on ships which makes possible water-tightness no matter how large the opening may be.

In accordance with the invention there is provided a door construction comprising a slidable door panel having wheels along two opposite sides, means for sliding the door across the opening on said wheels, guideways for confining the wheels during movement of the door from its open position adjacent the opening to its closed position across the opening, said guideways having portions movable toward the plane of the opening which are positioned to receive the door wheels when the door is in its fully closed position over the opening, means for moving the movable portions toward the plane of the opening, and gasket means positioned to be brought into water-tight sealing relationship between the door edges and the edges of the opening when the movable portions are moved toward the opening to carry the door toward the opening. The door and the opening are also suitably provided with dogging means to hold the door in closed position and advantageously the dogging means are constructed for simultaneous actuation.

It is a feature of the construction of the invention that the door panel can be brought into water-tight engagement with the edges of the opening smoothly and quickly regardless of the size of the opening.

It is a further feature of the invention that the means for moving the door and the means for moving the movable portions of the wheel guideways readily lend themselves to hydraulic actuation.

Other objects and features of the invention will be apparent from the following detailed description of illustrative embodiments of the invention and from the accompanying drawings wherein, Fig. 1 is a front elevational view of a door construction embodying features of the present invention;

Fig. 2 is a sectional view on an enlarged scale taken approximately along the line 2—2 of Fig. 1;

Fig. 3 is a side elevational view, partly in section, of the construction shown in Fig. 1, as it would be seen from the right-hand side of Fig. 1; the door being shown across the opening as in Fig. 1 but out of engagement with the edges of the opening;

Fig. 4 is an end view similar to that of Fig. 3 but showing the door in its inward water-tight position in engagement with the edges of the opening;

Fig. 5 is a top view, shown diagrammatically, of another embodiment of the invention;

Fig. 6 is a front elevational view of the construction shown in Fig. 5, illustrating the details of construction somewhat diagrammatically; and Fig. 7 is a side view, partly in section, of the construction of Figs. 5 and 6 as it appears from the right-hand side of these figures.

Fig. 8 is a fragmentary plan view of a modified construction having dogs carried by the door panel.

Referring to the drawings, and more particularly to Figs. 1 to 3, the hull 10 of the ship is formed with a rectangular opening or port 12 (broken lines) disposed between an upper deck 14 and a lower deck 15, the opening being defined by an inwardly-directed rim or flange 17. A door panel 20 is shown in position over the opening 12, the door panel being mounted for vertical movement between decks 14 and 15 in a plane parallel to the plane of the hull 10 adjacent the opening 12. For this purpose, the door panel 20 is connected at the lower ends of its right and left sides to the piston 22 of a hydraulic piston and cylinder assembly 23 by a pivot mounting 24, the cylinder 25 corresponding to each piston being secured to upper deck 14 by a pivot mounting shown at 28. The deck 15 is formed with a slot 30 adjacent the lower edge of the opening 12 to accommodate the door panel 20 to permit it to be lowered below deck 15 by actuation of the hydraulic assemblies 23. The sides of the door panel are provided with wheels or rollers 32 rotatably mounted on stub shafts 34 and these wheels are disposed in vertical guideways 36 which are positioned on the left- and right-hand sides of the door panel. As shown in Fig. 2, the guideways are U-shaped channels opening inwardly toward the door edge and the wheels are positioned for rolling engagement with the sides of the U.

As shown in Figs. 2 to 4, the face of the door panel 20 facing the opening 12 to be closed by the panel in water-tight relationship is formed with a gasket recess or channel 40 which extends entirely around the door panel and in this recess there is seated a gasket or packing 42. The gasket is formed from rubber or rubber composition, this term being used generically to include natural and synthetic rubber, and other elastomeric compounds or compositions having like properties and characteristics. The material is relatively firm and solid but sufficiently resilient and elastic to flow under pressure to conform to the surfaces between which it is confined. There is preferably employed a rubbery material which has high resistance to seat water, e. g. polychloroprene which is sold commercially under the trade designation "neoprene." Other examples of highly resistant rubber compositions are butadiene-acrylonitrile copolymers such as those known commercially by the trade designations Buna–N or GR–A. The gasket is not limited to these specific materials, however.

The guideways 36 are spaced from the hull 10 a distance such that when the door panel is moved up and down by the hydraulic assemblies the gasket 42 is free from engagement with the rim or flange 17 of the opening 12. The clearance between the gasket and the flange does not need to be great but should be sufficient to permit complete freedom of movement of the door panel e. g. ½ to 3 inches. In accordance with this invention, means are provided for moving the door panel into sealing engagement with the rim of the opening to be closed in an efficient, effective manner. For this purpose two portions of each of the guideways 36 are separate from the remainder of the guideway U-shaped channel and means are provided for moving these portions toward the opening. Thus, referring to Figs. 2 to 4, each guideway 36 is formed with upper and lower movable portions 45 secured to the end of the piston 48 of a hydraulic piston and cylinder assembly 50 suitably secured in any convenient manner to the ship, e. g. to a deck, e. g. decks 14 and 15, or to a bulkhead, or to a bracket, or the like. The wheels 32 are positioned on the door panel in vertically spaced-apart relationship so that the wheels are disposed inside the movable portions 45 of the guideways when the door panel is in its uppermost position as shown in Fig. 1. Consequently, when the hydraulic assemblies 50 are actuated to move the movable portions 45 toward the opening 12, the wheels 32 are simultaneously carried along and consequently the door panel is moved to bring the gasket or packing 42 into engagement with the relatively sharp edge of the rim or flange 17.

To hold the door panel securely in position once it has been brought into closed position relatively to the opening as described above, there are provided a plurality of dogs which are positioned to act upon suitable cam surfaces carried by the door panel. Thus, referring to Fig. 1, dogs 60 in the form of bell cranks are pivotally mounted on pivots 62 along the sides of the opening 12 but spaced inwardly from it so that they will lie on the inboard side of the door panel when the panel is in closed position over the opening. The dogs 60 are pivoted on brackets such as shown at 64, or bulkheads, as at 65, or the like. The dogs 60 at the left-hand and right-hand sides of the door panel are actuated by common driving bars 66 which are connected to the pistons 68 of hydraulic cylinder and piston assemblies 70 by means of a triangular bracket 72. The dogs at the upper and lower sides of the door panel are mounted on driving bars 75 which have their ends connected to the pistons 78 of hydraulic assemblies 80, suitably anchored to the ship below decks 14 and 15 respectively. The inboard side of the door panel 20 is provided with a plurality of cam blocks 82 providing a cam surface for engagement with the adjacent dog. It will be seen from the drawings that a cam block is positioned in alignment with each dog 60 for engagement thereby when the driving bars are actuated by the hydraulic assemblies associated with them.

When the opening or port 12 is uncovered to permit the loading or unloading of cargo from the hold of the ship, the door panel 20 is, of course, retracted below lower deck 15 and the slot 30 in the deck is covered by a removable plate or apron (not shown) to permit free movement of vehicle wheels through the port. When it is desired to close the port 12, as for example after all cargo has been loaded and the ship is being prepared to get underway, the removable apron is taken away and hydraulic fluid is introduced into the lower ends of the cylinders 25 to drive the pistons 22 upwardly. When the door panel has reached its uppermost position, the wheels 32 lie inside the movable portions 45 of the guideways, as seen in Fig. 3. The hydraulic assemblies 50 are then actuated to extend the pistons 48 and the door panel follows the movement of the movable portions 45 toward the rim 17 of the port 12 until the gasket 42 is brought into firm engagement with the port rim as shown in Figs. 2 and 4. The panel is then "dogged" into position by actuating the hydraulic assemblies 70 and 80 to move the dogs 60 into engagement with the cam blocks 82. This has the effect of driving the rim or flange 17 of the opening 12 into the rubbery material of the gasket 42 so that the desired watertightness is obtained and maintained. It will be understood that the hydraulic lines to the various hydraulic assemblies are interconnected to provide synchronous movement. Thus, all of the hydraulic assemblies 50 are interconnected so that they are simultaneously actuated to move all four movable portions 45 at the same time and at the same speed. Similarly, the hydraulic assemblies 80 are interconnected so that they move in unison with the piston at the left being retracted as the piston at the right is extended and vice versa. The hydraulic assemblies 70 for operating the right-hand and left-hand dogs are also suitably interconnected for simultaneous operation, although this is not always necessary. Thus, the fluid pressure in the various lines is created by positive displacement pumps which are connected mechanically so that they all turn at the same speed, each pump feeding each cylinder with the intakes of the pumps being fed from a common supply line. In this way there is provided a synchronous positive metering device which insures the desired synchronous simultaneous movement of the several piston and cylinder assemblies performing the same function.

To open the port 12, the steps described above are merely reversed. Thus, the dogs 60 are released by actuating the hydraulic assemblies 70 and 80, the movable portions 45 are brought back into alignment with the main portions of the guideways 36 with simultaneous inboard movement of the door panel 20 by actuating hydraulic assemblies 50, and the door panel is then lowered by exhausting the fluid from the lower ends of the cylinders 25.

It will be apparent that various changes and modifications may be made in the construction above described within the scope of this invention. For example, the door panel may be arranged for movement horizontally across the port rather than for vertical movement. Referring to Figs. 5 to 7, wherein parts corresponding to those shown in Figs. 1 to 4 have been given like reference numerals to which 100 has been added, the door panel 120 is provided with wheels or rollers 132 which are carried in horizontal, vertically spaced-apart guideways 136 extending across the top and bottom of the port 112 and the left-hand side of the port. Horizontal movement of the door panel from the open position shown in broken lines in Fig. 6 to the closed position shown in solid lines is effected by hydraulic assemblies 150 pivotally connected to the door panel and to a bulkhead or bracket of the ship. It will be seen that the upper rollers 132 are mounted on vertical axes while the lower rollers rotate on horizontal axes, the guideways 136 being suitably positioned to accommodate the two roller arrangements. The movable portions 145 of the guideways are horizontally spaced-apart a distance such that they receive the rollers when the door panel is in its full right-hand position across the port, as shown in solid lines in Fig. 6, and the movable portions are connected to hydraulic assemblies 150 for movement toward the port. Instead of being on the outboard face of the panel as in the construction of Figs. 1 to 4, the gasket or packing 142 is carried by a laterally-extending gasket recess 140. With this construction, the outboard face of the panel is substantially flush with the outer surface of the ship's side when the panel has been locked in water-tight position with the rim or flange 117 of the port 112 engaged in the body of the gasket 142 as shown in Figs. 5 and 7. Dogs are provided as in the Fig. 1 construction, only the dogs 160 and the hydraulic assembly 170 being shown in Fig. 6 in order to simplify the drawing. Because of the recessed position of the gasket, it will be apparent that substantial movement of the door panel toward and away from the port being closed is necessary to obtain the desired operation, the distance, e. g. 3 to 36 inches being chosen to give the necessary clearance.

It will also be apparent that various other changes and modifications may be made in the constructions described and illustrated without departing from the scope of the invention as defined in the appended claims. For example, the door panel may be disposed in a plane which is oblique with respect to the vertical either for horizontal or vertical movement to correspond to the shape of the ship's side in the vicinity of the port being closed. Further, the dogs may be carried by the door itself, rather than being mounted adjacent the door opening, with the cam surface blocks suitably positioned around the opening. This type of construction is shown in Fig. 8, wherein there are seen dogs 260 movably mounted on door panel 220 and actuated by a hydraulic piston and cylinder assembly 270 through the agency of a driving bar 266. Dogs 260 cooperate with cam blocks 282 rigidly mounted around the door opening on the inner side of a bar or other convenient supporting means. The dogs operate in the manner described above to press the door panel securely in the opening. It will be understood that the hydraulic fluid lines to the assembly 270 are flexible, e. g. flexible hoses, to permit the necessary movement of the door panel. Furthermore, while the dogs have been shown as pivotally mounted, it will be understood that they may be slidably mounted with equal facility.

It will also be understood that insofar as they are not mutually incompatible, the various features and details of construction of the several embodiments shown and described are interchangeable with one another. It is intended, therefore, that all matter contained in the foregoing description and in the drawings shall be interpreted as illustrative only and not as limitative of the invention.

What we claim and desire to secure by Letters Patent is:

1. A door construction for closing a side opening in the hull of a ship comprising, in combination, a slidable door panel having wheels along two opposite sides, selectively actuatable means connected to said door for sliding the door across the opening on said wheels, means defining guideways substantially parallel to the plane of said opening for confining the wheels during movement of the door from its open position adjacent the opening to its closed position across the opening, said guideways being substantially spaced from said plane and said guideways having portions movable toward the plane of the opening, said portions being positioned to receive the door wheels when the door is in its fully closed position over the opening, selectively actuatable means connected to said door for moving the movable portions toward the plane of the opening, and gasket means positioned to be brought into water-tight sealing relationship between the door edges and the edges of the opening when the movable portions are moved toward the opening to carry the door toward the opening.

2. A door construction for closing a side opening in the hull of a ship comprising, in combination, a slidable door panel having wheels along two opposite sides, selectively actuatable means connected to said door for sliding the door across the opening on said wheels, means defining guideways substantially parallel to the plane of said opening for confining the wheels during movement of the door from its open position adjacent the opening to its closed position across the opening, said guideways being substantially spaced from said plane and said guideways having portions movable toward the plane of the opening, said portions being positioned to receive the door wheels when the door is in its fully closed position over the opening, selectively actuatable means connected to said door for moving the movable portions toward the plane of the opening, gasket means positioned to be brought into water-tight sealing relationship between the door edges and the edges of the opening when the movable portions are moved toward the opening to carry the door toward the opening, and dogging means acting upon said door panel to hold the door panel in closed water-tight relationship with the opening.

3. A door construction for closing a side opening in the hull of a ship comprising, in a combination, a slidable door panel having wheels along two opposite sides, selectively actuatable hydraulic means connected to said door for sliding the door across the opening on said wheels, means defining guideways substantially parallel to the plane for confining the wheels during movement of the door from its open position adjacent the opening to its closed position across the opening, said guideways being substantially spaced from said plane and said guideways having portions movable toward the plane of the opening, said portions being positioned to receive the door wheels when the door is in its fully closed position over the opening selectively actuatable hydraulic means connected to said door for moving the movable portions toward the plane of the opening, and gasket means carried by said door panel and positioned to be brought into water-tight sealing relationship between the door edges and the edges of the opening when the movable portions are moved toward the opening to carry the door toward the opening.

4. A door construction for closing a side opening in the hull of a ship comprising, in combination, a vertically slidable door panel having wheels along two opposite sides, selectively actuatable means connected to said door for sliding the door across the opening on said wheels, means defining laterally spaced-apart vertical guideways substantially parallel to the plane for confining the wheels during movement of the door from its open position below the opening to its closed position across the opening, said guideways being substantially spaced from said plane and said guideways having portions movable horizontally toward the plane of the opening, said portions being positioned to receive the door wheels when the door is in its fully closed position over the opening, selectively actuatable means connected to said door for moving the movable portions horizontally toward the plane of the opening, and gasket means positioned to be brought into water-tight sealing relationship between the door edges and the edges of the opening when the movable portions are moved toward the opening to carry the door toward the opening.

5. A door construction for closing a side opening in the hull of a ship comprising, in combination, a horizontally slidable door panel having wheels along two opposite sides, selectively actuatable means connected to said door for sliding the door across the opening on said wheels, means defining vertically spaced-apart horizontal guideways substantially parallel to the plane for confining the wheels during movement of the door from its open position adjacent the opening to its closed position across the opening, said guideways being substantially spaced from said plane and said guideways having portions movable horizontally toward the plane of the opening, said portions being positioned to receive the door wheels when the door is in its fully closed position over the opening, selectively actuatable means connected to said door for moving the movable portions horizontally toward the plane of the opening, and gasket means positioned to be brought into water-tight sealing relationship between the door edges and the edges of the opening when the movable portions are moved toward the opening to carry the door toward the opening.

6. A door construction for closing a side opening in the hull of a ship comprising, in combination, a slidable door panel having wheels along two opposite sides, selectively actuatable means connected to said door for sliding the door across the opening on said wheels, means defining guideways substantially parallel to the plane for confining the wheels during movement of the door from its open position adjacent the opening to its closed position across the opening, said guideways being substantially spaced from said plane and said guideways having portions movable toward the plane of the opening, said portions being positioned to receive the door wheels when the door is in its fully closed position over the opening, selectively actuatable means connected to said door for moving the movable portions toward the plane of the opening, gasket means positioned to be brought into water-tight sealing relationship between the door edges and the edges of the opening when the movable portions are moved toward the opening to carry the door toward the opening, a plurality of sets of dogging means acting upon all sides of said door panel to hold the door panel in closed water-tight relationship with the opening, and means for actuating the dogging means of each set in unison.

7. A door construction for closing a side opening in the hull of a ship comprising, in combination, a slidable door panel having wheels along two opposite sides, selectively actuatable hydraulic means connected to said door for sliding the door across the opening on said wheels, means defining guideways substantially parallel to the plane for confining the wheels during movement of the door from its open position adjacent the opening to its closed position across the opening, said guideways being substantially spaced from said plane and said guideways having portions movable toward the plane of the opening, said portions being positioned to receive the door wheels when the door is in its fully closed position over the opening, selectively actuatable hydraulic means connected to said door for moving the movable portions toward the plane of the opening, gasket means carried by said door panel and positioned to be brought into water-tight sealing relationship between the door edges and the edges of the opening when the movable portions are moved toward the opening to carry the door toward the opening, a plurality of sets of dogging means acting upon all sides of said door panel to hold the door panel in closed water-tight relationship with the opening, and hydraulic means for actuating the dogging means of each set in unison.

References Cited in the file of this patent

UNITED STATES PATENTS

| | | |
|---|---|---|
| 678,407 | Lee | July 16, 1901 |
| 829,352 | Ralston | Aug. 21, 1906 |
| 2,179,495 | Court et al. | Nov. 14, 1939 |
| 2,587,863 | Lambert | Mar. 4, 1952 |

FOREIGN PATENTS

| | | |
|---|---|---|
| 125,086 | Great Britain | Apr. 17, 1919 |